(12) United States Patent
Goto et al.

(10) Patent No.: US 11,117,348 B2
(45) Date of Patent: Sep. 14, 2021

(54) HIGH-STRENGTH HOT-ROLLED COATED STEEL SHEET

(71) Applicant: JFE Steel Corporation, Tokyo (JP)

(72) Inventors: Sota Goto, Tokyo (JP); Kazuhiko Yamazaki, Tokyo (JP); Taro Kizu, Tokyo (JP); Shunsuke Toyoda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 57 days.

(21) Appl. No.: 16/491,717

(22) PCT Filed: Feb. 26, 2018

(86) PCT No.: PCT/JP2018/006847
§ 371 (c)(1),
(2) Date: Sep. 6, 2019

(87) PCT Pub. No.: WO2018/163871
PCT Pub. Date: Sep. 13, 2018

(65) Prior Publication Data
US 2021/0129491 A1    May 6, 2021

(30) Foreign Application Priority Data
Mar. 10, 2017   (JP) .............................. JP2017-045552

(51) Int. Cl.
| | | |
|---|---|---|
| *B32B 15/00* | (2006.01) | |
| *B32B 15/01* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/06* | (2006.01) | |
| *C22C 38/22* | (2006.01) | |
| *C22C 38/28* | (2006.01) | |
| *C22C 38/32* | (2006.01) | |
| *C22C 38/38* | (2006.01) | |
| *C23C 2/06* | (2006.01) | |
| *C23C 2/28* | (2006.01) | |
| *C23C 2/40* | (2006.01) | |

(52) U.S. Cl.
CPC ............ *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/06* (2013.01); *C22C 38/22* (2013.01); *C22C 38/28* (2013.01); *C22C 38/32* (2013.01); *C22C 38/38* (2013.01); *C23C 2/06* (2013.01); *C23C 2/28* (2013.01); *C23C 2/40* (2013.01); *C21D 2211/002* (2013.01); *C21D 2211/005* (2013.01); *Y10T 428/12799* (2015.01)

(58) Field of Classification Search
None
See application file for complete search history.

(56) References Cited

U.S. PATENT DOCUMENTS

| | | | |
|---|---|---|---|
| 2013/0087254 A1 | 4/2013 | Funkakawa et al. | |
| 2013/0133790 A1* | 5/2013 | Ariga ..................... | C21D 9/48 148/602 |
| 2013/0186523 A1* | 7/2013 | Ariga ..................... | C22C 38/14 148/507 |
| 2014/0295210 A1 | 10/2014 | Ariga et al. | |
| 2014/0305550 A1* | 10/2014 | Ariga ................... | C21D 8/0463 148/537 |
| 2014/0338801 A1 | 11/2014 | Nakajima et al. | |
| 2015/0368738 A1 | 12/2015 | Nakajima et al. | |
| 2015/0368741 A1 | 12/2015 | Nakajima et al. | |

FOREIGN PATENT DOCUMENTS

| | | |
|---|---|---|
| CN | 103917679 A | 7/2014 |
| CN | 104040002 A | 9/2014 |
| EP | 2767606 A1 | 8/2014 |
| EP | 3085805 A1 | 10/2016 |
| JP | 2005060836 A | 3/2005 |
| JP | 2011241429 A | 12/2011 |

(Continued)

OTHER PUBLICATIONS

International Search Report and Written Opinion for International Application No. PCT/JP2018/006847 dated May 22, 2018, 6 pages.
Kodym M., et al., "Trace Elements in Steel—Possibilities for Influencing the Smelting Operation"—Autorenkollektiv: "Spurenelemente im Stahl—Meoglichkeiten zur Beeinflussung im Smelzbetrieb," Jan. 1, 1985, XP002433212, Spurenelemente in Staehlen, Verlag Stahleisen, Duesseldorf, DE, with English translation of relevant parts, one page.
Extended European Search Report for European Application No. 18 763 910.9, dated Nov. 14, 2019, 8 pages.
European Communication pursuant to Article 94(3) for European Application No. 18 763 910.9, dated Aug. 28, 2020, 6 pages.
Korean Office Action for Korean Application No. 10-2019-7025989, dated Nov. 24, 2020, with Concise Statement of Relevance of Office Action, 5 pages.

(Continued)

*Primary Examiner* — Seth Dumbris
(74) *Attorney, Agent, or Firm* — RatnerPrestia

(57) ABSTRACT

Provided is a high-strength hot-rolled coated steel sheet with excellent formability,
A high-strength hot-rolled coated steel sheet has a constituent composition containing, in a mass percent, C: 0.03% to 0.15%, Si: 0.4% or less, Mn: 1.2% to 1.9%, Ti: 0.05% to 0.25%, B: 0.0005% to 0.0050%, P: 0.03% or less, S: 0.005% or less, Al: 0.005% to 0.4%, and N: 0.01% or less, the balance being Fe and incidental impurities. The total area fraction of one or more of ferrite and tempered bainite is 90% or more. The steel sheet has a structure in which the volume fraction of Ti carbides having particle sizes of 20 nm or less is 0.05 vol % or more.

4 Claims, No Drawings

(56) References Cited

FOREIGN PATENT DOCUMENTS

| | | |
|---|---|---|
| JP | 2011241456 A | 12/2011 |
| JP | 2012026032 A | 2/2012 |
| JP | 4917186 B2 | 4/2012 |
| JP | 2013044022 A | 3/2013 |
| JP | 2013100574 A | 5/2013 |
| JP | 2014148696 A | 8/2014 |
| JP | 2014148698 A | 8/2014 |
| JP | 2014173151 A | 9/2014 |
| KR | 20160105402 A | 9/2016 |
| WO | 2010131303 A1 | 11/2010 |

OTHER PUBLICATIONS

Chinese Office Action with Search Report for Chinese Application No. 201880017392.9, dated Oct. 19, 2020, 9 pages.
Korean Grant of Patent for Korean Application No. 10-2010-7025989, dated May 6, 2021 with translation, 4 pages.
Chinese Office Action for Chinese Application No. 201880017392.9, dated Jun. 1, 2021 with Concise Statement of Relevance of Office Action, 5 pages.

* cited by examiner

HIGH-STRENGTH HOT-ROLLED COATED STEEL SHEET

CROSS REFERENCE TO RELATED APPLICATIONS

This is the U.S. National Phase application of PCT/JP2018/006847, filed Feb. 26, 2018, which claims priority to Japanese Patent Application No. 2017-045552, filed Mar. 10, 2017, the disclosures of these applications being incorporated herein by reference in their entirety for all purposes.

FIELD OF THE INVENTION

The present invention relates to high-strength hot-rolled coated steel sheets excellent in formability that are suitable for use as materials for structural members such as those in automobiles, transportation equipment, and construction equipment.

BACKGROUND OF THE INVENTION

There is currently a need to reduce $CO_2$ emissions on a worldwide scale, In the automobile industry, there is a constant need to achieve a weight reduction without a decrease in car body strength to improve fuel efficiency. One effective approach to achieve a weight reduction without a decrease in car body strength is to reduce a thickness of steel sheets used as materials for members while increasing the strength of the steel sheets. Accordingly, high-strength hot-rolled steel sheets with tensile strengths of 570 MPa or more have recently been used for automotive members. The surfaces of such hot-rolled steel sheets are often coated in order to reduce corrosion thinning, particularly when the steel sheets are used for members such as suspension components.

However, punching workability and stretch-flange formability, which are important for forming automotive suspension components, generally become worse as the strength of the steel sheets becomes higher. Accordingly, various studies have been made to improve the punching workability and stretch-flange formability of high-strength hot-rolled steel sheets and hot-rolled coated steel sheets.

For example, Patent Literature 1 discloses a method for obtaining a high-strength hot-rolled steel sheet excellent in ductility and stretch-flange formability that has a tensile strength of 500 MPa or more. The steel sheet contains, in a mass percent, C: 0.03% to 0.35%, Si: 0.01% to 2.0%, Mn: 0.3% to 4.0%, P: 0.001% to 0.10%, S: 0.0005% to 0.05%, N: 0.0005% to 0.010%, and Al: 0.01% to 2.0%, the balance being Fe and incidental impurities. The steel sheet is subjected to recrystallization control and runout table cooling during hot rolling or reheating after hot rolling. The steel sheet has a metal structure in which the coverage of ferrite grains with martensite phase is more than 30%.

Patent Literature 2 discloses a method for obtaining a high-strength hot-dip galvanized steel sheet excellent in stretch-flange formability that has a tensile strength of 590 MPa or more. The steel sheet has a constituent composition containing, in a mass percent, C: 0.02% to 0.075%, Si: 0.001% to 0.2%, Mn: 2.0% to 4.5%, P: 0.1% or less, S: 0.01% or less, sol, Al: 0.001% to 0.2%, N: 0.01% or less, and O: 0.01% or less. The amounts of Ti and Nb added satisfy $0.14 \leq Ti+Nb/2 \leq 0.3$. Since the steel sheet has a larger amount of Mn added thereto than conventional steel sheets, the formation of coarse cementite, martensite, and austenite phases is inhibited in a hot-dip galvanizing treatment step.

Patent Literature 3 discloses a method for obtaining a high-strength hot-dip galvanized hot-rolled steel sheet excellent in ductility and stretch-flange formability that has a tensile strength of 500 MPa or more. The hot-rolled steel sheet has a chemical composition containing, in a mass percent, C: 0.03% to 0.12%, Si: 0.01% to 0.5%, Mn: 1.4% to 5.0%, P: 0.05% or less, S: 0.010% or less, sol. Al: 0.001% to 0.5%, and N: 0.020% or less. The hot-rolled steel sheet is subjected to heat treatment in which the steel sheet is heated to the temperature range of 650° C. to 950° C., is cooled to 550° C. at an average cooling rate of 3° C./s to 20° C./s, and is held in the temperature range of 420° C. to 550° C. for 20 seconds to 90 seconds. The steel sheet has a metal structure in which the volume fraction of ferrite is 30% to 94%, the volume fraction of bainite is 5% to 69%, and the total volume fraction of retained austenite and martensite is 1.0% to 10%.

Patent Literature 4 discloses a method for obtaining a high-strength hot-dip galvanized steel sheet excellent in ductility and stretch-flange formability that has a tensile strength of 490 MPa or more. The steel sheet has a chemical composition containing, in a mass percent, C: 0.02% to 0.10%, Sia 0.005% to 0.5%, Mn: 1.4% to 2.5%, P: 0.025% or less, S: 0.010% or less, sol. Al: 0.001% to 0.2%, N: 0.008% or less, and Ti: 0.15% or less and further containing one or two or more elements selected from the group consisting of Ca: 0.01% or less, Mg: 0.01% or less, and REM: 0.01% or less, The chemical composition satisfies formulas (3) to (5) below. The steel sheet has a steel structure in which the area percentage of ferrite is 50% to 94%, the area percentage of bainite is 5% to 49%, and the total area percentage of martensite and retained austenite is 1% to 20%.

$$C-(12/48) \times Ti^* - (12/93) \times Nb \leq 0.090 \qquad (3)$$

$$Ti^* = \max[Ti-(48/14) \times N - (48/32) \times S, 0] \qquad (4)$$

$$\tfrac{2}{3} \times C + (\tfrac{1}{150}) \times Mn + P + 2 \times S < 0.15 \qquad (5)$$

Here, the element symbols in formulae (3) to (5) represent the contents (unit: mass percent) of the individual elements, and max[ ] in formula (4) is a function that returns the maximum value of the arguments in [ ].

Patent Literature 5 discloses a method for inhibiting cracking at punched fracture surfaces and the formation of uneven surfaces in a high-strength hot-rolled steel sheet having a tensile strength of 590 MPa or more. The steel sheet has a composition that contains C: 0.025% to 0.15%, Si: 0.01% to 1.0%, Mn: 1.0% to 2.5%, P: 0.02% or less, S: 0.005% or less, Al: 0.5% or less, Ti: 0.04% to 0.10%, and N: 0.007% or less, the balance being Fe and incidental impurities, and that has a Mn/Ti ratio, in a mass percent, of 15 or more. A waiting time of 45 seconds or more is provided between rough rolling and finish rolling. The rolling reduction in the last three stages of the finish rolling is 25% or more. Thereby the steel sheet has a metal structure in which the average aspect ratio of ellipses equivalent to crystal grains is 5 or less and the average distribution density of Ti-based carbides having particle sizes of 20 nm or more at ferrite grain interfaces is 10 particles/μm or less.

CITATION LIST

Patent Literature

PTL 1: Japanese Unexamined Patent Application Publication No. 2014-173151

PTL 2: Japanese Unexamined Patent Application Publication No. 2011-241429

PTL 3: Japanese Unexamined Patent Application Publication No. 2011-241456
PTL 4: Japanese Unexamined Patent Application Publication No. 2013-44022
PTL 5: Japanese Patent No. 4917186

SUMMARY OF THE INVENTION

However, the technique described in Patent Literature 1 has a problem in that it requires intermediate spontaneous cooling during runout table cooling, which results in unstable properties over the entire length of the steel sheet. In addition, there is no consideration of the fact that hard second phases such as martensite tend to act as origins of cracks at punched edge surfaces during punching.

The technique described in Patent Literature 2 has a problem in that the steel sheet contains a larger amount of Mn than conventional steel sheets, which tends to form Mn oxide on the surface of the steel sheet in an annealing step of the coating treatment. Thus, it is not easy to stably form a coated layer on the surface of the steel sheet over the entire length of the steel sheet.

The techniques described in Patent Literature 3 and Patent Literature 4 have a problem in that the metal structure contains at least 1% or more of hard phases such as martensite and retained austenite, which tend to cause cracking at punched edge surfaces. In addition, Patent Literature 4 teaches the addition of Ca, Mg, and REM in order to improve the hole expansion formability. These elements, however, form coarse oxides unless a proper balance is maintained between the amounts of these elements added and the amounts of O and S present in the steel sheet. Such oxides act as origins of cracks and thus degrade the hole expansion formability and the condition of punched edge surfaces.

The technique described in Patent Literature 5 has a problem in that, since there is no sufficient consideration of the optimization of the metal structure, it is difficult to achieve the desired hole expansion ratio in a hole expansion test performed after punching even if the formation of elongated grains and the amount of TiC precipitated are controlled within their respective proper ranges. Furthermore, TiC may coarsen even if the hot-rolled steel sheet is reheated and subjected to coating under the conditions described in Patent Literature 5, which may make it impossible to achieve the desired high strength.

An object according to aspects of the present invention is to solve the foregoing problems and provide a high-strength hot-rolled coated steel sheet excellent in formability.

To solve the foregoing problems, the inventors have conducted intensive research in order to improve the formability (punching workability and stretch-flange formability) of hot-rolled coated steel sheets while ensuring a tensile strength of 570 MPa or more.

As a result, the inventors have found that the formability (punching workability and stretch-flange formability) can be improved if the main phase is ferrite phase or tempered bainite phase, both of which have relatively low dislocation density within crystal grains. This effect is attributable to an improvement in base-steel toughness due to the low dislocation density and an improvement in toughness due to the reduced proportion of second phases, other than the main phase, that act as origins of cracks.

Furthermore, the inventors have found that, even if the main phase is ferrite phase or tempered bainite phase, both of which have low dislocation density, a tensile strength as high as 570 MPa or more can be stably achieved if the particle sizes of metal carbides such as Ti carbides are controlled to 20 nm or less so that they are finely dispersed in the steel.

In addition, the inventors have found that, if the ferrite phase or tempered bainite phase is strengthened by dispersing fine metal carbides, the difference in hardness between the main and second phases is reduced, thus further improving the stretch-flange formability.

Aspects of the present invention are based on the foregoing findings and have been made as a result of further research for optimum constituent composition and metal structure.

A summary of aspects of the present invention is as follows.

[1] A high-strength hot-rolled coated steel sheet having a constituent composition containing, in a mass percent, C: 0.03% to 0.15%, Si: 0.4% or less, Mn: 1.2% to 1.9%, Ti: 0.05% to 0.25%, B: 0.0005% to 0.0050%, P: 0.03% or less, S: 0.005% or less, Al: 0.005% to 0.4%, and N: 0.01% or less, the balance being Fe and incidental impurities, a total area fraction of one or more of ferrite and tempered bainite is 90% or more, a structure in which a volume fraction of Ti carbides having particle sizes of 20 nm or less is 0.05 vol % or more, and a coated layer or an alloyed coated layer on a surface thereof.

[2] The high-strength hot-rolled coated steel sheet according to [1] further having, in addition to the constituent composition, in a mass percent, one or more of Nb, V, Zr, Mo, Cr, W, Ta, and Hf in a total amount of 0.1% or less.

[3] The high-strength hot-rolled coated steel sheet according to [1] or [2] further having, in addition to the constituent composition, in a mass percent, one or more of Ca: 0.005% or less, Mg: 0.005% or less, and REM: 0.005% or less in a total amount satisfying inequality (1):

$$0.5 \leq [\% X]^*/1.25[\% S] \leq 5.0 \tag{1}$$

where $[\% X]^* = [\% X] - (0.18 + 130[\% X]) \times [\% O]$, $[\% X] = [\% Ca] + [\% Mg] + [\% REM]$, and $[\% O] \leq 0.005\%$; and

[% S], [% O], [% Ca], [% Mg], and [% REM] are the contents (in a mass percent) of the individual elements and are zero if the elements are not present.

In accordance with aspects of the present invention, "high strength" refers to a tensile strength (TS) of 570 MPa or more. "Excellent in formability" refers to excellent punching workability and stretch-flange formability. "Excellent punching workability" refers to an arithmetical average roughness Ra of 15 μm or less in a fracture surface portion that appears at a punched edge surface. "Excellent stretch-flange formability" refers to a critical hole expansion ratio (λ) (also simply referred to as hole expansion ratio) of 60% or more. "Steel sheet" includes steel sheets and steel strips.

Aspects of the present invention advantageously solve the foregoing problems with the conventional art and provide a high-strength hot-rolled coated steel sheet excellent in formability. Since the high-strength hot-rolled coated steel sheet has a tensile strength as high as 570 MPa or more as well as good punching workability, high stretch-flange formability, and good coatability, the steel sheet is suitable as a material for structural members such as those in automobiles, transportation equipment, and construction equipment.

As discussed above, the present invention is an industrially very useful invention.

DETAILED DESCRIPTION OF EMBODIMENTS OF THE INVENTION

Embodiments of the present invention will hereinafter be specifically described.

First, the reasons for the limitations on the constituent composition of a high-strength hot-rolled coated steel sheet according to aspects of the present invention will be described. The percentages representing the following constituent composition mean mass percentages unless otherwise specified.

C: 0.03% to 0.15%

C is an element that contributes to improved strength by forming metal carbides in the steel sheet. If the C content falls below 0.03%, the desired strength cannot be achieved. On the other hand, if the C content exceeds 0.15%, the amounts of bainite, pearlite, cementite, martensite, and retained austenite formed in the steel sheet increase, thus degrading the punching workability and the stretch-flange formability. Accordingly, the C content is 0.03% to 0.15%. Preferably, the C content is 0.05% to 0.13%, more preferably 0.06% to 0.13%, even more preferably 0.07% to 0.11%.

Si: 0.4% or Less

Si is an element effective in improving the strength without decreasing the ductility. However, Si interferes with the deposition of the coated layer and thus degrades the corrosion resistance of the coated steel sheet. Accordingly, the upper limit of the Si content is 0.4%. Preferably, the Si content is 0.2% or less, more preferably 0.05% or less. A Si content of zero causes no problem.

Mn: 1.2% to 1.9%

Mn is an element that contributes to improved strength of the steel sheet through solid solution strengthening and crystal grain refinement strengthening. If the Mn content falls below 1.2%, the desired strength cannot be achieved. On the other hand, if the Mn content exceeds 1.9%, the hardenability increases excessively, and coarse martensite and retained austenite are formed, thus degrading the punching workability and the stretch-flange formability. Accordingly, the Mn content is 1.2% to 1.9%. Preferably, the Mn content is 1.40% to 1.85%, more preferably 1.41% to 1.80%.

Ti: 0.05% to 0.25%

Ti, which is an element important in accordance with aspects of the present invention, contributes to increased strength of the steel sheet by precipitation as fine Ti carbides during annealing treatment performed before coating treatment. If the Ti content falls below 0.05%, the desired strength cannot be achieved since an insufficient amount of Ti carbide precipitates. If the Ti content exceeds 0.25%, the amount of coarse Ti carbonitrides, which act as origins of cracks, increases, thus degrading the punching workability and the stretch-flange formability. Accordingly, the Ti content is 0.05% to 0.25%. Preferably, the Ti content is 0.05% to 0.20%, more preferably 0.05% to 0.15%.

B: 0.0005% to 0.0050%

B is added to improve the hardenability and inhibit excessive formation of bainite, pearlite, and cementite. To achieve this effect, the B content needs to be 0.0005% or more. On the other hand, if the B content exceeds 0.0050%, the hardenability increases excessively, and coarse martensite and retained austenite are formed, thus degrading the punching workability and the stretch-flange formability. Accordingly, the B content is 0.0005% to 0.0050%. Preferably, the B content is 0.0005% to 0.0040%, more preferably 0.0005% to 0.0030%.

P: 0.03% or Less

P, which is an element present as an impurity, decreases the toughness by segregation at prior-austenite grain boundaries. Although it is preferred to minimize the P content to increase the punching workability and the stretch-flange formability, a P content of up to 0.03% is acceptable. Accordingly, the P content is 0.03% or less. Preferably, the P content is 0.02% or less. A P content of zero causes no problem.

S: 0.005% or Less

S forms Ti sulfide and thus interferes with the strength-improving effect produced by the addition of Ti. S also forms Mn sulfide and thus degrades the punching workability and the stretch-flange formability. Although it is preferred to minimize the S content, a S content of up to 0.005% or less is acceptable. Accordingly, the S content is 0.005% or less. Preferably, the S content is 0.004% or less, more preferably 0.003% or less. A S content of zero causes no problem.

Al: 0.005% to 0.4%

Al is an element effective in improving the cleanliness of the steel by acting as a deoxidizer, To achieve this effect, the Al content needs to be 0.005% or more, On the other hand, if the Al content exceeds 0.4%, the amount of Al-oxide-based inclusions increases, thus degrading the punching workability and the stretch-flange formability. Accordingly, the Al content is 0.005% to 0.4%. Preferably, the Al content is 0.005% to 0.1%, more preferably 0.01% to 0.06%.

N: 0.01% or Less

N tends to form coarse nitrides by combining with Ti at high temperature, thus degrading the punching workability and the stretch-flange formability. Accordingly, the N content is 0.01% or less. Preferably, the N content is 0.008% or less, more preferably 0.006% or less. A N content of zero causes no problem.

The foregoing is the basic constituent composition in accordance with aspects of the present invention.

In addition to the basic constituent composition described above, the steel sheet may further contain, in a mass percent, one or more of Nb, V, Zr, Mo, Cr, W, Ta, and Hf in a total amount of 0.1% or less. These elements contribute to increased strength by forming carbides, either alone or in combination with Ti. However, when present in a total amount of more than 0.1%, these elements may interfere with the formation of fine Ti carbides and may thus decrease the strength.

To make Mn sulfide harmless and thereby further improve the punching workability and the stretch-flange formability, the steel sheet may contain, in a mass percent, one or more of Ca: 0.005% or less, Mg: 0.005% or less, and REM: 0.005% or less in a total amount satisfying inequality (1):

$$0.5 \leq [\% X]^*/1.25[\% S] \leq 5.0 \tag{1}$$

where $[\% X]^* = [\% X] - (0.18 + 130[\% X]) \times [\% O]$, $[\% X] = [\% Ca] + [\% Mg] + [\% REM]$, and $[\% O] \leq 0.005\%$;

and

[% S], [% O], [% Ca], [% Mg], and [% REM] are the contents (in a mass percent) of the individual elements and are zero if the elements are not present.

If $[\% X]^*/1.25[\% S]$ falls below 0.5, these elements are no longer effective in making Mn sulfide harmless, If $[\% X]^*/1.25[\% S]$ exceeds 5.0, the amount of Ca-, Mg-, and REM-oxide-based inclusions may increase, thus degrading the punching workability and the stretch-flange formability. If Ca, Mg, and REM are present in a total amount satisfying inequality (1) above, a proper balance is maintained between the total amount of Ca, Mg, and REM added and the amounts of O and S present in the steel sheet; therefore, they do not degrade the hole expansion formability or the condition of punched edge surfaces by forming coarse oxides that act as origins of cracks. Inequality (1) above is preferably 0.8 to 4.5, more preferably 1.0 to 4.0.

The balance is Fe and incidental impurities. For example, elements derived from materials such as ores and scraps (e.g., Cu, Ni, Sb, As, Sn, and Pb) have no influence on the advantages according to aspects of the present invention if the total amount of those elements added is 1% or less.

The steel sheet according to aspects of the present invention has a coated layer on the surface thereof to increase the corrosion resistance so that the steel sheet can be used as a hot-rolled steel sheet suitable as a material for automotive components, which are exposed to severe corrosion environments. The coated layer may be any type of coated layer and may be either an electroplated coating or a hot-dip coating. A suitable example of a hot-dip coating is a hot-dip galvanized coating. The coated layer may also be an alloyed coating subjected to alloying treatment.

Next, the reasons for the limitations on the structure of and carbides in the high-strength hot-rolled coated steel sheet according to aspects of the present invention will be described.

The high-strength hot-rolled coated steel sheet according to aspects of the present invention contains, as the main phase, one or more of ferrite and tempered bainite, and the total area fraction of the main phase is 90% or more. In addition, Ti carbides having particle sizes of 20 nm or less are finely dispersed, and the volume fraction of Ti carbides having particle sizes of 20 nm or less is 0.05 vol % or more. The main phase is one or more of ferrite and tempered bainite, and the total area fraction of the main phase is 90% or more To improve the punching workability and stretch-flange formability of the high-strength hot-rolled coated steel sheet according to aspects of the present invention, it is effective for the metal structure of the steel sheet to be substantially composed only of a structure with low dislocation density. Accordingly, the main phase in accordance with aspects of the present invention is a structure with low dislocation density. Specifically, the main phase in accordance with aspects of the present invention is ferrite, tempered bainite, or ferrite and tempered bainite. If the total area fraction of the main phase (one or more of ferrite and tempered bainite) is 90% or more, the punching workability and the stretch-flange formability are improved. Preferably, the total area fraction of the main phase is 92% or more.

Specifically, a structure with low dislocation density in accordance with aspects of the present invention is defined as a structure with a grain orientation spread of 4° or less as determined by the SEM/EBSD method. The grain orientation spread is determined by calculating the arithmetic average of the differences in orientation between a certain measurement point within one crystal grain and other measurement points within the same crystal grain, performing similar calculations for all measurement points within the same crystal grain, and calculating the arithmetic average thereof. The grain orientation spread is believed to correlate with average strain information within crystal grains, that is, dislocation density. Such structures with grain orientation spreads of 4° or less, that is, structures with low dislocation density, include ferrite that is formed through phase transformation in a hot rolling step, tempered bainite that is formed when a hot-rolled steel sheet containing bainite as the main phase is reheated to the Ac3 temperature or lower, and ferrite phase that forms through phase transformation from reverse-transformation austenite when a hot-rolled steel sheet is reheated to the Ac3 temperature or lower. Examples of structures other than ferrite and tempered bainite present in the steel sheet according to aspects of the present invention include bainite, pearlite, martensite, and retained austenite. The total area fraction of these structures is 10% or less. Of these, martensite and retained austenite have a large influence on punching workability and stretch-flange formability; therefore, the total area fraction thereof is preferably less than 1%, and particularly, the total area fraction of coarse grains having major axes of 1 µm or more is preferably less than 1%.

The volume fraction of Ti carbides having particle sizes of 20 nm or less is 0.05 vol % or more To achieve a tensile strength as high as 570 MPa or more for a metal structure containing, as the main phase, ferrite or tempered bainite, both of which have low dislocation density, the steel needs to be strengthened by dispersing Ti carbides having particle sizes of 20 nm or less in the steel. The particle size of Ti carbides is very important for fine dispersion strengthening. If the amount of Ti carbides having particle sizes of more than 20 nm increases, it may be impossible to achieve the desired level of strengthening.

Here, the particle sizes of Ti carbides are evaluated by converting the sizes of Ti carbides observed under a transmission electron microscope (TEM) into equivalent circle diameters by image analysis software (Image J).

The amount of Ti carbides is also important for fine dispersion strengthening. If the volume fraction of Ti carbides having particle sizes of 20 nm or less falls below 0.05 vol %, the desired level of strengthening cannot be achieved. Here, the volume fraction of Ti carbides, f, is determined by equation (2):

$$f=(A_{MC} \times \rho_{Fe} \times [\% M_P])/(A_M \times \rho_{MC}) \qquad (2)$$

where $A_{MC}$ is the atomic weight (g/mol) of Ti carbides, $A_M$ is the atomic weight (g/mol) of Ti, $\rho_{Fe}$ is the density (g/cm$^3$) of α-iron, $\rho_{MC}$ is the density (g/cm$^3$) of Ti carbides, and [% $M_P$] is the mass concentration of Ti present in Ti carbides having particle sizes of 20 nm or less relative to all elements added. [% $M_P$] is determined by inductively coupled plasma atomic emission spectroscopy of Ti carbides, having particle sizes of 20 nm or less, that have been separated by the electrolytic extraction residue method.

The Ti carbides may contain Nb, V, Zr, Mo, Cr, W, Ta, and Hf. If the Ti carbides contain other elements, or if metal carbides other than Ti carbides are present, the physical properties and mass concentration of Ti and Ti carbides are used for the calculation of the volume fraction f by equation (2). Simple metal carbides of Nb, V, Zr, Mo, Cr, W, Ta, and Hf may be present together with Ti carbides. In accordance with aspects of the present invention, carbides of Ti with metals such as Nb, V, Zr, Mo, Cr, W, Ta, and Hf are also regarded as Ti carbides. In accordance with aspects of the present invention, the volume fractions of these carbides are not incorporated into the metal structure fractions.

Next, a method for manufacturing the high-strength hot-rolled coated steel sheet excellent in formability according to aspects of the present invention will be described.

The high-strength hot-rolled coated steel sheet according to aspects of the present invention can be manufactured by subjecting a steel having the constituent composition described above to a hot rolling process composed of rough rolling and finish rolling, cooling and coiling the steel sheet upon completion of finish rolling to obtain a hot-rolled steel sheet, annealing the hot-rolled steel sheet, and depositing a coated layer.

In accordance with aspects of the present invention, the steel may be prepared by any process, including known preparation processes such as those using converters and electric furnaces. Although it is preferred that the prepared steel be cast into a slab (steel) by continuous casting in view of problems such as segregation, the steel may also be cast into a slab by a known casting process such as ingot making and slabbing or thin slab continuous casting. The cast slab may be hot-rolled after reheating in a heating furnace. Alternatively, if the slab remains at a predetermined temperature or higher, it may be directly rolled without reheating.

In accordance with aspects of the present invention, any carbides in the slab need to be dissolved before rough rolling. When the slab in accordance with aspects of the present invention, which contains Ti, is heated, the heating temperature is 1,150° C. or higher. The slab heating temperature, however, is 1,350° C. or lower since an excessive heating temperature results in excessive surface oxidation and therefore the formation of $TiO_2$, which consumes Ti and is therefore likely to decrease the strength of the surface layer of the resulting steel sheet. As described above, if the carbides in the slab have been sufficiently dissolved because the slab remains at a predetermined temperature or higher before rough rolling, the step of heating the steel before rough rolling may be omitted. There is no particular limitation on the conditions for rough rolling.

In accordance with aspects of the present invention, it is important to minimize the precipitation of Ti carbides in the hot rolling step to obtain a high-strength hot-rolled coated steel sheet having a metal structure in which fine Ti carbides having particle sizes of 20 nm or less are dispersed. If a large amount of Ti carbide precipitates in the hot rolling step, the Ti carbides grow and coarsen in the subsequent annealing step, and the desired strength cannot be achieved. Furthermore, a hardness difference occurs between the main and second phases, thus degrading the punching workability and the stretch-flange formability. In addition, if Ti carbides are dispersed by aging precipitation in the annealing step, the desired shape of Ti carbides, strength, punching workability, and stretch-flange formability can be stably achieved over the entire width and length of the steel sheet. Thus, it is also preferred from the viewpoint of manufacture stability to minimize the precipitation of Ti carbides in the hot rolling step.

The temperature conditions for finish rolling and cooling and coiling after finish rolling are set from the above viewpoint. Finish rolling is performed in the temperature range of 840° C. or higher. If the finish rolling temperature falls below 840° C., ferrite transformation tends to proceed during rolling, and metal carbides such as Ti carbides precipitate simultaneously with ferrite transformation. Preferably, finish rolling is performed in the temperature range of 850° C. or higher.

Cooling after finish rolling is performed at an average cooling rate of 30° C./s or more between 780° C. and 680° C. If the average cooling rate falls below 30° C./s, ferrite transformation proceeds during cooling, and Ti carbides precipitate. Preferably, the average cooling rate is 60° C./s or more.

The coiling temperature is 350° C. to 550° C. If the coiling temperature falls below 350° C., martensite phase, which has very high dislocation density, forms in the metal structure, and it is difficult to ensure that a structure with low dislocation density, i.e., a grain orientation spread of 4° or less, is present in an amount of 90% or more after the subsequently annealing step. On the other hand, if the coiling temperature exceeds 550° C., ferrite transformation proceeds in the coiling step, and Ti carbides precipitate in the hot-rolled steel sheet. Such Ti carbides may grow and decrease the strength of the steel sheet in the annealing step before the deposition of a coated layer.

The hot-rolled steel sheet manufactured in the hot rolling step may be subjected to temper rolling as usual and may also be subjected to pickling to remove any scale formed on the surface thereof.

The hot-rolled steel sheet is then subjected to annealing treatment. The annealing temperature is higher than 700° C. and lower than 900° C. If the annealing temperature is 700° C. or lower, a sufficient amount of Ti carbides, having particle sizes of 20 nm or less, that are formed by aging precipitation cannot be ensured. In addition, the Fe oxide film present on the surface of the hot-rolled steel sheet may be insufficiently removed, and therefore, it may be impossible to ensure good coatability. On the other hand, if the annealing temperature is 900° C. or higher, the amount of coarse Ti carbides having particle sizes of more than 20 nm increases. In either case, the desired strength, punching workability, and stretch-flange formability cannot be achieved. Preferably, the annealing temperature is higher than 700° C. and lower than 880° C.

When annealing is performed at higher than 700° C. and lower than 900° C., the holding time is 5 s to 200 s. If the holding time is less than 5 s, a sufficient amount of Ti carbides cannot be formed even if the annealing temperature is lower than 900° C. On the other hand, if the holding time exceeds 200 s, the coarsening of Ti carbides cannot be inhibited even if the annealing temperature is higher than 700° C. Preferably, the holding time is 10 s to 180 s.

The hot-rolled steel sheet subjected to the annealing step described above is subjected to coating treatment. The coating treatment may be either electroplating or hot-dip plating. For example, the coating treatment may be hot-dip galvanizing treatment. Optionally, the hot-dip galvanizing treatment may be followed by alloying treatment. In this case, it is preferred that the plating bath temperature and the alloying treatment temperature be not higher than the annealing temperature described above to inhibit excessive coarsening of Ti carbides.

The hot-rolled coated steel sheet described above may be subjected to temper rolling as usual.

EXAMPLES

Aspects of the present invention will now be described in more detail based on the following examples.

Molten steels having the constituent compositions shown in Table 1 were prepared in a converter and were cast into slabs having a thickness of 250 mm by continuous casting. These slabs (steels) were heated under the conditions shown in Table 2 and were then subjected to hot rolling, cooling, and coiling steps under the conditions shown in Table 2 to prepare hot-rolled steel sheets having a thickness of 2.6 mm and a width of 1,000 mm. After subsequent pickling and temper rolling at a rolling reduction of 0.5%, the hot-rolled steel sheets were subjected to an annealing step under the conditions shown in Table 2 and were immersed in a bath of molten zinc at 450° C. to form a galvanized layer on the surfaces of the steel sheets. Some steel sheets were further subjected to coated layer alloying treatment at 500° C. for 100 seconds.

Test specimens were removed from the thus-obtained hot-rolled coated steel sheets and were subjected to structural observation, a tensile test, a punching test, and a hole expansion test. Coatability was also evaluated. The test methods were as follows.

(1) Structural Observation

After a thickness cross-section parallel to the rolling direction of each resulting hot-rolled coated steel sheet was polished, the cross-section was subjected to mirror finish polishing with colloidal silica solution. Electron backscatter diffraction (EBSD) patterns were acquired with a CCD camera (available from EDAX Inc.) attached to a scanning electron microscope. The EBSD measurement was performed by irradiation with an electron beam at a distance (measurement distance) of 0.5 μm in two fields of view with an area of 300 μm$^2$ or more that were randomly selected from each of the quarter-thickness position and the half-thickness position. From the measured EBSD patterns, the number of crystal grains having grain orientation spreads of 4° or less was determined using the analysis software OIM Analysis available from TSL Solutions K.K., and the number proportion thereof in the measurement region was calculated. Thus, the total area fraction of one or more of ferrite and tempered bainite was determined. In this measurement, a cluster of measurement points in which the difference in orientation between all adjacent measurement points was less than 5° was defined as one crystal grain.

Furthermore, a thin test specimen removed from each hot-rolled coated steel sheet was used to observe 100 or more Ti carbides under a transmission electron microscope (TEM) available from JEOL Ltd. at a magnification of 100,000×. The equivalent circle diameters of the carbides were determined by image processing software (Image J).

In addition, Ti carbides were electrolytically extracted from a test specimen removed from each hot-rolled coated steel sheet, were sized with an alumina filter having a pore size of 20 nm, and were dissolved in acid. The concentration of Ti present as Ti carbides (mass percentage relative to all elements added) was then determined by inductively coupled plasma atomic emission spectroscopy, and the volume fraction of Ti carbides having particle sizes of 20 nm or less was determined.

The area fraction of martensite and retained austenite was determined as follows. First, a test specimen for structural observation was removed from each hot-rolled steel sheet, and a thickness cross-section parallel to the rolling direction was polished and etched with an etchant (LePera's reagent) to expose martensite and retained austenite. The cross-section was then observed under a light microscope (magnification: 500×) at the quarter-thickness position and the half-thickness position (the central position along the thickness). Ellipse approximation was performed by image processing software (Image J), and grains having major axes of 1 μm or more were selected. The area fraction of martensite and retained austenite having major axes of 1 μm or more was determined.

(2) Tensile Test

A JIS No. 5 tensile test specimen was removed from each resulting hot-rolled coated steel sheet such that the tensile direction was perpendicular to the rolling direction and was subjected to a tensile test in accordance with the provisions of JIS Z 2241 to determine the yield strength (YS), the tensile strength (TS), and the total elongation (El). The passing criterion for tensile strength (TS) was 570 MPa or more. The passing criterion for total elongation (EL) was 10% or more.

(3) Punching Test 30 mm square test specimens were removed from each resulting hot-rolled coated steel sheet. A flat-bottomed punch with a diameter of 10 mm was used to make a punch hole in the center of each test specimen, with a hold-down plate placed on top of the test specimen to hold the test specimen. The die hole diameter was selected such that the punch clearance was 10%, 15%, 20%, 25%, or 30%. After punching, the arithmetical average roughness Ra in the thickness direction of the punched edge surfaces at which the cross-section was perpendicular to the rolling direction was measured under a laser microscope (available from Keyence Corporation). The five punch holes were evaluated for punching workability as follows: the test specimens were rated as "excellent" if the five punch holes had an Ra of 15 μm or less and as "good" if three or four of the punch holes had an Ra of 15 μm or less, with "excellent" and "good" being satisfactory, and other test specimens were rated as "poor" (unsatisfactory). An Ra of 15 μm or less at a punched edge surface was used as a passing criterion since an Ra of more than 15 μm tends to result in poor phosphatability at the punched edge surface.

(4) Hole Expansion Test 100 mm square test specimens were removed from each resulting hot-rolled coated steel sheet. A flat-bottomed punch with a diameter of 10 mm was used to punch the center of each test specimen such that the punch clearance was 12.5%. The hole was expanded by pushing a conical punch with an apex angle of 60° upward from the punch side. When a distinct crack occurred through the thickness, the conical punch was stopped, and the hole diameter at that time was measured. The difference between the hole diameter after hole expansion and the hole diameter before hole expansion was divided by the value before hole expansion and was multiplied by 100. Thus, the hole expansion ratio (λ) was determined as a measure of stretch-flange formability. A hole expansion ratio (λ) of 60% or more was determined to be satisfactory.

(5) Coatability

Each resulting hot-rolled coated steel sheet was visually evaluated for coatability by appearance inspection. Hot-rolled coated steel sheets having a coated layer formed over the entire length and width were rated as "good". Hot-rolled coated steel sheets on which some uncoated area was observed were rated as "poor".

The results thus obtained are shown in Table 3.

TABLE 1

| Steel No. | % by mass | | | | | | | | | | Inequality (1) | |
|---|---|---|---|---|---|---|---|---|---|---|---|---|
| | C | Si | Mn | P | S | Al | N | Ti | B | Others | | |
| A | 0.048 | 0.04 | 1.85 | 0.015 | 0.0022 | 0.038 | 0.0033 | 0.221 | 0.0008 | — | | Inventive example |
| B | 0.135 | 0.16 | 1.41 | 0.013 | 0.0029 | 0.035 | 0.0028 | 0.063 | 0.0015 | — | | Inventive example |

TABLE 1-continued

% by mass

| Steel No. | C | Si | Mn | P | S | Al | N | Ti | B | Others | Inequality (1) | |
|---|---|---|---|---|---|---|---|---|---|---|---|---|
| C | 0.089 | 0.02 | 1.48 | 0.008 | 0.0015 | 0.042 | 0.0035 | 0.081 | 0.0019 | | — | Inventive example |
| D | 0.114 | 0.01 | 1.53 | 0.009 | 0.0011 | 0.350 | 0.0039 | 0.115 | 0.0022 | | — | Inventive example |
| E | 0.075 | 0.05 | 1.62 | 0.011 | 0.0014 | 0.040 | 0.0027 | 0.075 | 0.0017 | V: 0.093 | — | Inventive example |
| F | 0.065 | 0.21 | 1.74 | 0.009 | 0.0009 | 0.033 | 0.0026 | 0.120 | 0.0012 | Nb: 0.015, Zr: 0.055 | — | Inventive example |
| G | 0.106 | 0.01 | 1.59 | 0.008 | 0.0011 | 0.035 | 0.0028 | 0.093 | 0.0018 | Mo: 0.020, Cr: 0.045, W: 0.011 | — | Inventive example |
| H | 0.068 | 0.13 | 1.43 | 0.013 | 0.0015 | 0.041 | 0.0034 | 0.055 | 0.0039 | Ta: 0.016, Hf: 0.033 | — | Inventive example |
| I | 0.123 | 0.22 | 1.45 | 0.009 | 0.0012 | 0.033 | 0.0030 | 0.088 | 0.0022 | Ca: 0.0022, O: 0.0025 | 0.7 | Inventive example |
| J | 0.054 | 0.18 | 1.68 | 0.008 | 0.0004 | 0.054 | 0.0029 | 0.185 | 0.0020 | Mg: 0.0015, REM: 0.0016, O: 0.0021 | 3.8 | Inventive example |
| K | 0.015 | 0.01 | 1.5 | 0.014 | 0.0013 | 0.034 | 0.0039 | 0.104 | 0.0018 | | — | Comparative example |
| L | 0.165 | 0.03 | 1.55 | 0.011 | 0.0011 | 0.041 | 0.0029 | 0.112 | 0.0017 | | — | Comparative example |
| M | 0.125 | 0.61 | 1.41 | 0.012 | 0.0010 | 0.042 | 0.0031 | 0.095 | 0.0013 | | — | Comparative example |
| N | 0.135 | 0.04 | 1.14 | 0.010 | 0.0009 | 0.033 | 0.0032 | 0.058 | 0.0030 | | — | Comparative example |
| O | 0.078 | 0.05 | 1.96 | 0.008 | 0.0018 | 0.034 | 0.0033 | 0.063 | 0.0028 | | — | Comparative example |
| P | 0.144 | 0.11 | 1.43 | 0.008 | 0.0014 | 0.038 | 0.0027 | 0.044 | 0.0011 | | — | Comparative example |
| Q | 0.035 | 0.09 | 1.55 | 0.008 | 0.0008 | 0.035 | 0.0034 | 0.256 | 0.0018 | | — | Comparative example |
| R | 0.043 | 0.15 | 1.52 | 0.012 | 0.0004 | 0.034 | 0.0030 | 0.196 | 0.0002 | | — | Comparative example |
| S | 0.105 | 0.21 | 1.73 | 0.010 | 0.0009 | 0.042 | 0.0032 | 0.112 | 0.0055 | | — | Comparative example |

TABLE 2

| Steel Sheet No. | Steel No. | Slab heating temperature °C. | Finish rolling temperature °C. | Average cooling rate °C./s | Coiling temperature °C. | Annealing temperature °C. | Annealing time s | Alloying treatment | |
|---|---|---|---|---|---|---|---|---|---|
| 1 | A | 1250 | 875 | 63 | 500 | 850 | 50 | No | Inventive example |
| 2 | A | 1145 | 930 | 30 | 520 | 780 | 45 | Yes | Comparative example |
| 3 | A | 1300 | 830 | 30 | 360 | 830 | 10 | Yes | Comparative example |
| 4 | A | 1240 | 885 | 2 | 480 | 850 | 90 | No | Comparative example |
| 5 | B | 1220 | 930 | 63 | 510 | 720 | 55 | No | Inventive example |
| 6 | B | 1360 | 920 | 55 | 520 | 715 | 65 | Yes | Comparative example |
| 7 | C | 1200 | 855 | 75 | 515 | 780 | 50 | No | Inventive example |
| 8 | C | 1260 | 820 | 57 | 535 | 850 | 20 | Yes | Comparative example |
| 9 | C | 1160 | 925 | 63 | 335 | 800 | 90 | No | Comparative example |
| 10 | C | 1260 | 890 | 36 | 564 | 800 | 50 | Yes | Comparative example |
| 11 | C | 1180 | 870 | 42 | 525 | 680 | 30 | No | Comparative example |
| 12 | C | 1220 | 900 | 57 | 525 | 940 | 55 | Yes | Comparative example |
| 13 | C | 1180 | 845 | 36 | 510 | 735 | 215 | Yes | Comparative example |
| 14 | C | 1250 | 880 | 33 | 440 | 880 | 4 | No | Comparative example |

TABLE 2-continued

| Steel Sheet No. | Steel No. | Slab heating temperature ° C. | Finish rolling temperature ° C. | Average cooling rate ° C./s | Coiling temperature ° C. | Annealing temperature ° C. | Annealing time s | Alloying treatment | |
|---|---|---|---|---|---|---|---|---|---|
| 15 | D | 1160 | 935 | 60 | 510 | 760 | 60 | Yes | Inventive example |
| 16 | E | 1200 | 930 | 51 | 490 | 820 | 45 | Yes | Inventive example |
| 17 | F | 1300 | 900 | 42 | 520 | 710 | 50 | Yes | Inventive example |
| 18 | G | 1250 | 895 | 51 | 480 | 870 | 65 | Yes | Inventive example |
| 19 | H | 1260 | 900 | 51 | 530 | 720 | 50 | Yes | Inventive example |
| 20 | I | 1250 | 905 | 72 | 510 | 730 | 80 | Yes | Inventive example |
| 21 | J | 1220 | 850 | 63 | 515 | 720 | 50 | Yes | Inventive example |
| 22 | K | 1180 | 905 | 60 | 530 | 720 | 45 | Yes | Comparative example |
| 23 | L | 1180 | 895 | 33 | 515 | 720 | 60 | No | Comparative example |
| 24 | M | 1230 | 890 | 63 | 515 | 705 | 45 | Yes | Comparative example |
| 25 | N | 1160 | 905 | 39 | 515 | 850 | 65 | No | Comparative example |
| 26 | O | 1200 | 855 | 30 | 400 | 850 | 60 | No | Comparative example |
| 27 | P | 1300 | 940 | 39 | 535 | 750 | 10 | Yes | Comparative example |
| 28 | Q | 1240 | 865 | 42 | 555 | 720 | 60 | Yes | Comparative example |
| 29 | R | 1230 | 940 | 57 | 510 | 710 | 70 | Yes | Comparative example |
| 30 | S | 1250 | 920 | 53 | 530 | 735 | 60 | No | Comparative example |

TABLE 3

| Steel Sheet No. | Steel No. | Type of main phase | Area fraction of crystal grains with GOS ≤ 4° % | Remaining structure | Area fraction of M and A with major axes of 1 μm or more % | Volume fraction of Ti carbides having particle sizes of 20 nm or less vol % | Yield strength YS MPa | Tensile strength TS MPa | Total elongation El % | Punching workability | Hole expansion formability λ % | Coatability | |
|---|---|---|---|---|---|---|---|---|---|---|---|---|---|
| 1 | A | F + TB | 95 | B | — | 0.31 | 804 | 902 | 16 | Excellent | 65 | Good | Inventive example |
| 2 | A | TB + F | 92 | B | — | 0.03 | 476 | 528 | 31 | Excellent | 55 | Good | Comparative example |
| 3 | A | F + TB | 92 | B | — | 0.02 | 475 | 538 | 30 | Good | 55 | Good | Comparative example |
| 4 | A | F | 79 | P, M | 1.5 | 0.02 | 438 | 466 | 32 | Poor | 50 | Good | Comparative example |
| 5 | B | TB | 100 | — | — | 0.09 | 694 | 754 | 22 | Excellent | 80 | Good | Inventive example |
| 6 | B | F + TB | 95 | B | — | 0.03 | 481 | 546 | 30 | Excellent | 45 | Good | Comparative example |
| 7 | C | TB + F | 100 | — | — | 0.12 | 624 | 693 | 24 | Excellent | 90 | Good | Inventive example |
| 8 | C | TB + F | 92 | P | — | 0.02 | 403 | 463 | 35 | Excellent | 50 | Good | Comparative example |

TABLE 3-continued

| Steel Sheet No. | Steel No. | Type of main phase | Area fraction of crystal grains with GOS ≤ 4° % | Remaining structure | Area fraction of M and A with major axes of 1 μm or more % | Volume fraction of Ti carbides having particle sizes of 20 nm or less vol % | Yield strength YS MPa | Tensile strength TS MPa | Total elongation El % | Punching workability | Hole expansion formability λ % | Coatability | |
|---|---|---|---|---|---|---|---|---|---|---|---|---|---|
| 9 | C | M | 45 | F | 55 | 0.11 | 807 | 832 | 20 | Poor | 20 | Good | Comparative example |
| 10 | C | TB + F | 84 | P, B | — | 0.02 | 465 | 522 | 32 | Poor | 45 | Good | Comparative example |
| 11 | C | TB | 75 | B | — | 0.03 | 533 | 567 | 29 | Good | 120 | Poor | Comparative example |
| 12 | C | F | 96 | P, B | — | 0.02 | 304 | 366 | 45 | Good | 58 | Poor | Comparative example |
| 13 | C | TB | 100 | — | — | 0.03 | 533 | 561 | 30 | Good | 110 | Good | Comparative example |
| 14 | C | F | 95 | B | — | 0.01 | 461 | 549 | 29 | Good | 55 | Good | Comparative example |
| 15 | D | TB | 93 | B | — | 0.16 | 818 | 879 | 18 | Excellent | 70 | Good | Inventive example |
| 16 | E | TB + F | 94 | B | — | 0.11 | 651 | 740 | 21 | Excellent | 85 | Good | Inventive example |
| 17 | F | F | 95 | B, M | 0.4 | 0.13 | 529 | 623 | 27 | Excellent | 105 | Good | Inventive example |
| 18 | G | TB + F | 94 | B | — | 0.13 | 642 | 730 | 23 | Excellent | 80 | Good | Inventive example |
| 19 | H | F + TB | 97 | B | — | 0.08 | 550 | 640 | 26 | Excellent | 95 | Good | Inventive example |
| 20 | I | F + TB | 98 | B, M | 0.5 | 0.14 | 592 | 680 | 24 | Excellent | 95 | Good | Inventive example |
| 21 | J | TB | 100 | — | — | 0.26 | 917 | 986 | 15 | Excellent | 62 | Good | Inventive example |
| 22 | K | TB | 100 | — | — | 0.14 | 496 | 549 | 31 | Good | 80 | Good | Comparative example |
| 23 | L | TB | 80 | B, M | 3.0 | 0.16 | 869 | 955 | 15 | Poor | 30 | Good | Comparative example |
| 24 | M | TB | 100 | — | — | 0.13 | 883 | 940 | 17 | Good | 60 | Poor | Comparative example |
| 25 | N | F + TB | 95 | B | — | 0.10 | 513 | 566 | 30 | Good | 100 | Good | Comparative example |
| 26 | O | TB + F | 92 | B, M | 1.6 | 0.09 | 639 | 726 | 23 | Poor | 40 | Good | Comparative example |
| 27 | P | F + TB | 98 | B | — | 0.06 | 492 | 569 | 28 | Good | 100 | Good | Comparative example |
| 28 | Q | TB | 100 | — | — | 0.08 | 567 | 615 | 29 | Poor | 45 | Good | Comparative example |
| 29 | R | F + TB | 85 | P | — | 0.27 | 925 | 966 | 16 | Poor | 30 | Good | Comparative example |

TABLE 3-continued

| Steel Sheet No. | Steel No. | Type of main phase | Area fraction of crystal grains with GOS ≤ 4° % | Remaining structure | Area fraction of M and A with major axes of 1 μm or more % | Volume fraction of Ti carbides having particle sizes of 20 nm or less vol % | Yield strength YS MPa | Tensile strength TS MPa | Total elongation El % | Punching workability — | Hole expansion formability λ % | Coatability | |
|---|---|---|---|---|---|---|---|---|---|---|---|---|---|
| 30 | S | F + TB | 90 | B, M | 2.3 | 0.16 | 649 | 741 | 21 | Poor | 52 | Good | Comparative example |

F: ferrite
M: martensite
TB: tempered bainite
A: retained austenite
B: bainite
GOS: grain orientation spread
P: pearlite In all inventive examples, high-strength hot-rolled coated steel sheets excellent in formability that had a TS of 570 MPa or more, an Ra of 15 μm or less, and a λ of 60% or more were obtained. In contrast, in the comparative examples, which are outside the scope of the present invention, any of TS, Ra, λ, and coatability was inferior.

The invention claimed is:

1. A high-strength hot-rolled coated steel sheet having a constituent composition comprising, in a mass percent:
   C: 0.03% to 0.15%;
   Si: 0.4% or less;
   Mn: 1.2% to 1.9%;
   Ti: 0.05% to 0.25%;
   B: 0.0005% to 0.0050%;
   P: 0.03% or less;
   S: 0.005% or less;
   Al: 0.005% to 0.4%; and
   N: 0.01% or less,
   the balance being Fe and incidental impurities,
   wherein a total area fraction of one or more of ferrite and tempered bainite is 90% or more,
   the steel sheet has a structure in which a volume fraction of Ti carbides having particle sizes of 20 nm or less is 0.05 vol % or more,
   the steel sheet has a coated layer or an alloyed coated layer on a surface thereof, and
   the steel sheet has a tensile strength of 570 MPa or more, an arithmetic average roughness Ra of a fractured surface portion appearing on a punching end face of 15 μm or less, and a critical hole expansion ratio of 60% or more.

2. The high-strength hot-rolled coated steel sheet according to claim 1, further comprising, in addition to the constituent composition, in a mass percent, one or more of Nb, V, Zr, Mo, Cr, W, Ta, and Hf in a total amount of 0.1% or less.

3. The high-strength hot-rolled coated steel sheet according to claim 1, further comprising, in addition to the constituent composition, in a mass percent, one or more of:
   Ca: 0.005% or less;
   Mg: 0.005% or less; and
   REM: 0.005% or less
   in a total amount satisfying inequality (1):

$$0.5 \leq [\% X]^*/1.25[\% S] \leq 5.0 \quad (1)$$

where

[% X]* = [% X] − (0.18 + 130[% X]) × [% O], [% X] = [% Ca] + [% Mg] + [% REM], and [% O] ≤ 0.005%; and

[% S], [% O], [% Ca], [% Mg], and [% REM] are contents (in a mass percent) of the individual elements and are zero if the elements are not present.

4. The high-strength hot-rolled coated steel sheet according to claim 2, further comprising, in addition to the constituent composition, in a mass percent, one or more of:
   Ca: 0.005% or less;
   Mg: 0.005% or less; and
   REM: 0.005% or less
   in a total amount satisfying inequality (1):

$$0.5 \leq [\% X]^*/1.25[\% S] \leq 5.0 \quad (1)$$

where

[% X]* = [% X] − (0.18 + 130[% X]) × [% O], [% X] = [% Ca] + [% Mg] + [% REM], and [% O] ≤ 0.005%; and

[% S], [% O], [% Ca], [% Mg], and [REM] are contents (in a mass percent) of the individual elements and are zero if the elements are not present.

* * * * *